March 12, 1963 J. R. OISHEI ET AL 3,080,595
WINDSHIELD CLEANING APPARATUS
Filed April 20, 1959 2 Sheets-Sheet 1
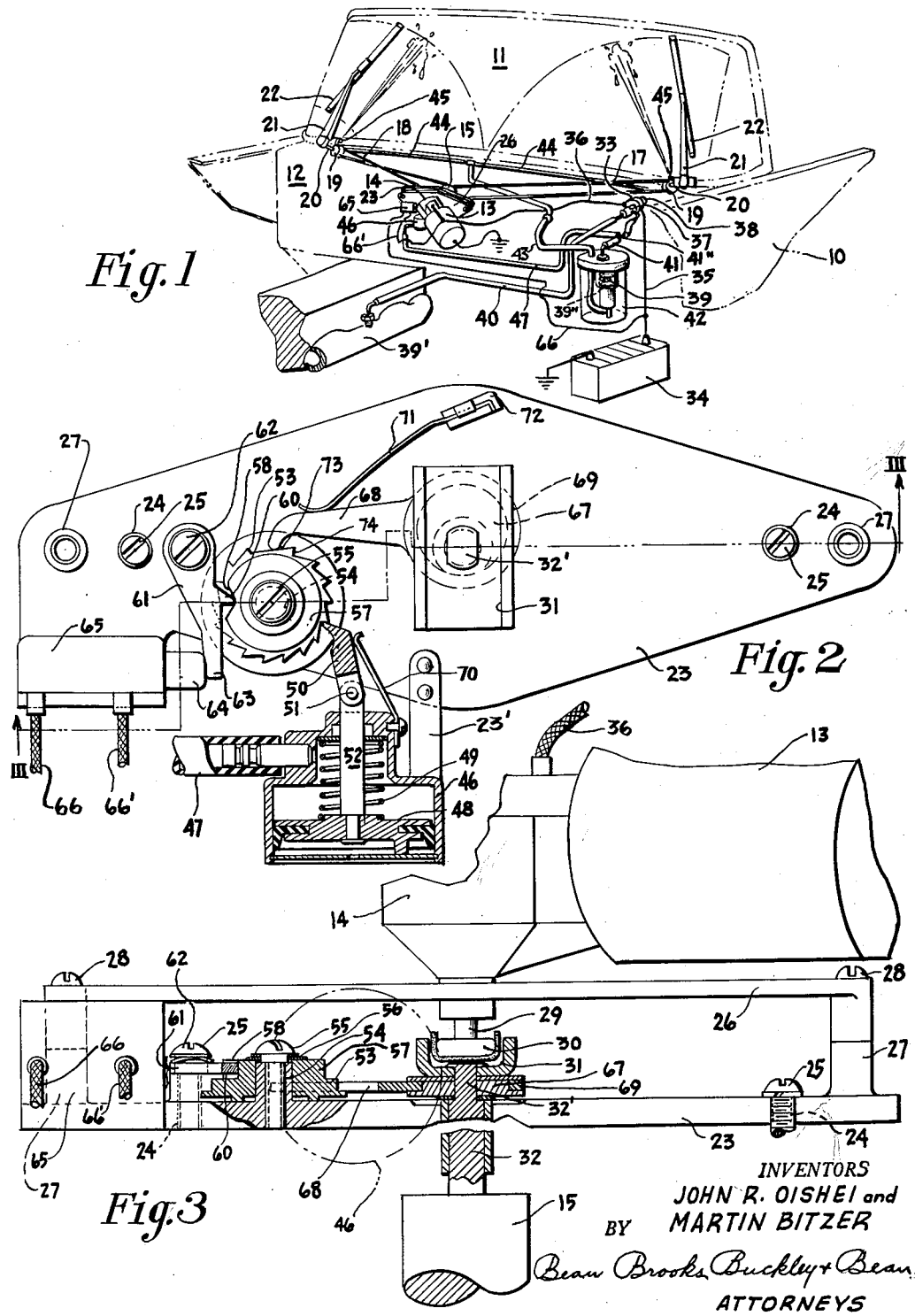
INVENTORS
JOHN R. OISHEI and
BY MARTIN BITZER
Bean Brooks Buckley + Bean
ATTORNEYS March 12, 1963  J. R. OISHEI ET AL  3,080,595
WINDSHIELD CLEANING APPARATUS
Filed April 20, 1959  2 Sheets-Sheet 2
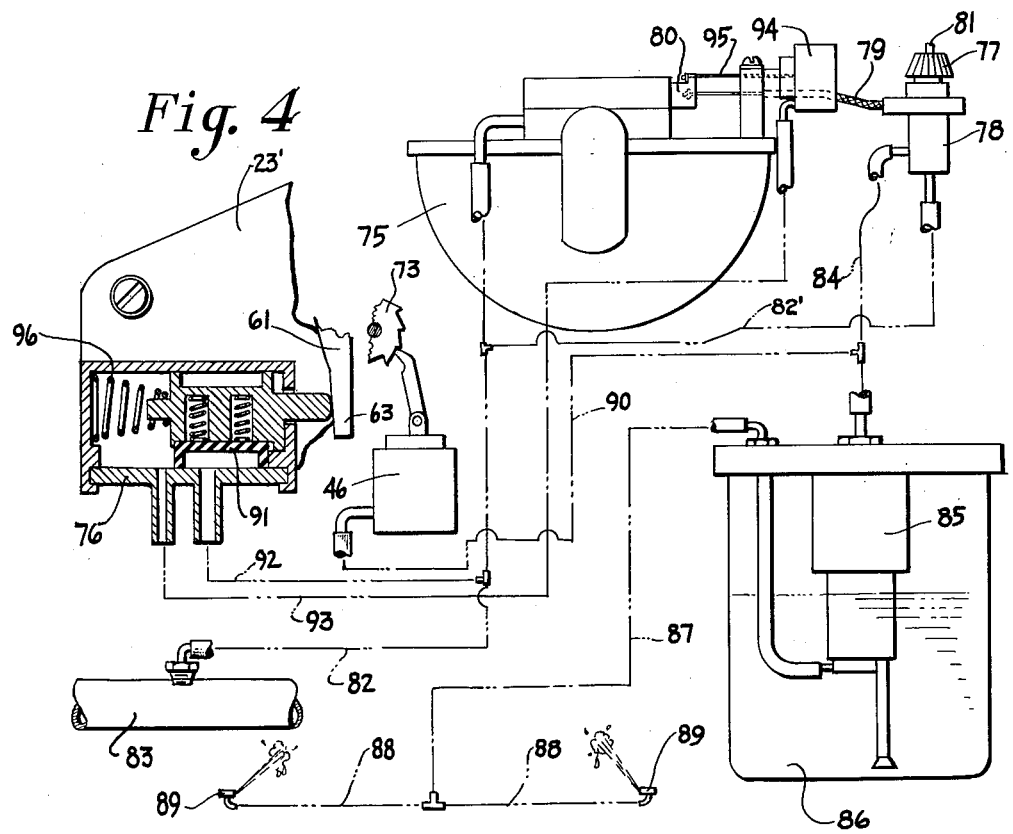
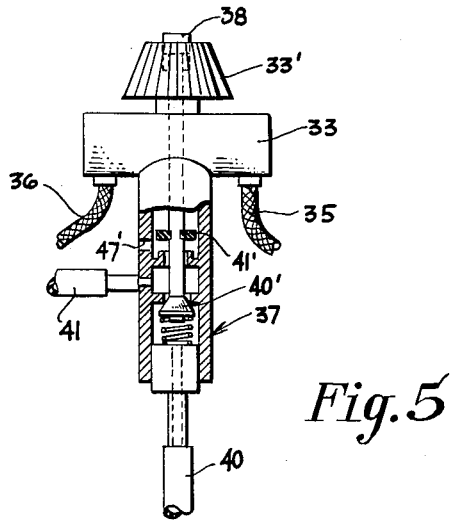
INVENTORS
JOHN R. OISHEI and
BY MARTIN BITZER
Bean Brooks Buckley Bean.
ATTORNEYS

3,080,595
Patented Mar. 12, 1963

3,080,595
WINDSHIELD CLEANING APPARATUS
John R. Oishei, Buffalo, and Martin Bitzer, Kenmore, N.Y., assignors to Trico Products Corporation, Buffalo, N.Y.
Filed Apr. 20, 1959, Ser. No. 807,652
5 Claims. (Cl. 15—250.02)

The present invention relates to a windshield cleaning system wherein the windshield is jointly acted on by a solvent and windshield wipers and, more particularly, to an improved timing mechanism therefor.

It is the primary object of the present invention to provide a universal timing assembly which may be combined with an electric, pneumatic, or hydraulic wiper motor for the purpose of regulating the number of wiping strokes which the wiper motor produces during a windshield cleaning operation wherein the windshield is jointly acted on by a wiper blade and a projected solvent.

Another object of the present invention is to provide a timing assembly of the above described type which is not only fabricated from relatively low-cost, simple parts, but is also capable of providing a predetermined number of cycles of wiper blade action during a windshield cleaning operation.

A further object of the present invention is to provide a timer of the above-described type which may be installed in an existing windshield wiper installation for the purpose of causing the motor to automatically produce a predetermined number of wiper strokes when utilized jointly with a washer during a windshield cleaning operation. Other objects and attendant advantages of the present invention will readily be perceived hereafter.

The universal timing mechanism of the present invention consists of a mechanical arrangement which is actuated solely in response to the mechanical output of the wiper motor and therefore can be used equally well in conjunction with wiper motors of the electric, pneumatic or hydraulic types. In accordance with the present invention, a plate containing timing mechanism for a wiper motor is adapted to be positioned proximate the portion of the vehicle where the wiper motor is normally mounted. A coupling arrangement is provided between the timer and the wiper motor so that when the washer is placed in operation, the timer will automatically cause the wiper motor to operate for a predetermined number of wiper strokes. Thereafter, the wiper motor will be automatically parked.

During a windshield cleaning operation, the charge of solvent is projected on a windshield in less time than is required for the predetermined number of wiper strokes to be executed. However, since the washer and wiper are caused to start operation substantially simultaneously, the timing mechanism will therefore provide a predetermined number of wiper cycles after the cessation of washer operation to thereby insure wiping of the windshield to a clear, dry state.

The universal timer of the present invention may be substituted for existing portions of a wiper linkage to provide accurate wiper motor timing during a windshield cleaning operation where it was previously unavailable. More particularly, certain automotive installations utilize an auxiliary driver. The auxiliary driver is a bracket containing structure which detachably couples the wiper motor to other of the drive links of the wiper system. The timer of the present invention may be substituted for the above-described auxiliary driver to thereby provide a predetermined number of wiper strokes during a windshield cleaning operation. This substitution is feasible because the timer mechanism is of substantially the same size as the auxiliary driver which it replaces. The present invention will be more fully understood when the following portions of the specifications are read in conjunction with the accompanying drawings wherein:

FIG. 1 is a fragmentary perspective view of an automotive vehicle mounting a windshield clearing system which includes the universal timer of the present invention;

FIG. 2 is an elevational view of the timer;

FIG. 3 is a view taken along line III—III of FIG. 2;

FIG. 4 is a schematic view of an alternate embodiment of the invention shown in FIG. 1; and FIG. 5 is a view, partly in cross-section, of an actuating switch for the wiper system.

In FIG. 1, an automotive vehicle 10 is shown having a windshield 11 mounted thereon in the conventional manner. Suitably mounted on the vehicle firewall 12 or beneath the dashboard, is a motor 13 which is coupled to gear box 14 which, in turn, produces an oscillating motion which causes drum 15 to oscillate. The oscillation of drum 15 is transmitted to pulleys 19 through cables 17 and 18. Pulleys 19, in turn, are mounted on rockshafts 20 which, in turn, mount wiper arms 21 which carry wiper blades 22. As is well understood in the art, whenever wiper motor 13 is placed in operation, wiper blades 22 will be caused to oscillate across the windshield.

In accordance with the present invention, it is desired to provide a universal timer which may be utilized in conjunction with a wiper motor, such as electric motor 13, for the purpose of causing the wiper motor to drive the wiper blades 22 across the windshield a predetermined number of times during a windshield washing operation. To this end, a plate 23 (FIGS. 2 and 3) is provided having apertures 24 therein for receiving bolts 25 which affix the plate to mounting structure (not shown) on the vehicle. Plate 23 carries all of the timing mechanism required during a windshield washing operation. The wiper motor 13 is mounted on bracket 26 which is adapted to be secured to lugs 27 on plate 23 by bolts 28. It is to be noted that shaft 29 (FIG. 3) extending from gear box 14 has a rectangular universal driver member 30 attached thereto which is adapted to be received in channel 31 secured to shaft 32, which is journaled in plate 23. It will therefore readily be appreciated that whenever motor 13 causes gear box 14 to produce oscillation of shaft 29, drum 15 will oscillate correspondingly to drive wipers 22 in the above-described manner.

Whenever it is desired to cause wiper motor 13 to operate without the washer to clear the windshield during rainy weather, it is only necessary to manipulate knob 33' (FIG. 5) to close single-pole single-throw switch 33 for the purpose of causing current to flow from battery 34 to electric motor 13 through leads 35 and 36, it being appreciated that both the battery and the motor are grounded to complete the circuit. Switch 33 forms a part of a combined washer and wiper switch (FIG. 5), but it will readily be understood that it may be separate therefrom, if desired.

Whenever it is desired to effect a windshield cleaning operation, control button 38 of switch 37 (FIGS. 1 and 5) is momentarily depressed to unseat valve 40' and seat valve 41' to permit vacuum to communicate with washer pump 39 through conduits 40 and 41, which extend between washer pump 39 and manifold 39'. This will cause pump 39, which may be of the type disclosed in Patent #2,743,473, to draw a charge of solvent from reservoir 42 and expel it onto the windshield through conduits 43 and 44, and nozzles 45.

When the vacuum is first being supplied to pump 39 in the above-described manner, electric motor 13 is placed in operation to provide wiper action to accompany the projecting of solvent onto the windshield. The wiper motor is caused to provide a predetermined number of cycles of wiper blade operation in the following manner: The vacuum in conduit 41 is caused to communicate with fluid pressure motor 46 (FIG. 2), which is mounted on plate 23 by bracket 23'. This is effected through T 41' which causes conduit 47 to be in communication with conduit 41 leading to the washer pump. Piston 48 in motor 46 will therefore be moved upwardly against the bias of spring 49. This, in turn, will cause pawl 50, which is pivotally mounted at 51 on the end of motor shaft 52, to cause ratchet 53 to move a small distance in a counterclockwise direction because of the engagement between pawl 50 and a tooth of ratchet 53. Ratchet 53 is mounted on stub shaft 54 extending from plate 23, and screw 55 and spring washer 56 maintain ratchet 53 in position thereon. Integrally formed with ratchet 53 is a cam 57 which is generally concentric with stub shaft 54 except for notch 58 at one portion in the periphery thereof. When ratchet 53 and cam 57 are caused to move in a counterclockwise direction, the projection 60 of cam follower 61 will move up on the concentric portion of cam 57. This, in turn, will cause cam follower 61 to pivot in a clockwise direction about the neck of screw 62. The end 63 of cam follower 61 will therefore cause stem 64 of microswitch 65 to move to the left. This action of the switch will complete a circuit to electric wiper motor 13 through leads 35, 66, and 66', since the other sides of both the battery and the motor are grounded. In the foregoing manner, operation of wiper motor 13 is initiated.

When button 38 of washer switch 37 is released, the latter returns to the position of FIG. 5, and conduit 41, which is in communication with conduit 47, is vented through vent 47' in switch 37, and therefore motor 46 (FIG. 2) is also vented. This will permit spring 49 to cause piston 48 to return to the position shown in the drawing.

As motor 13 causes driver 30 and channel 31 to oscillate back and forth, the eccentric connection between shaft portion 32' and disc 67, which is non-rotatably mounted thereon, will cause driving pawl 68, which has a collar 69 rotatably mounted on disc 67, to move back and forth in synchronism with the oscillation of shaft 32' and engage each of the ratchet teeth in sequence to drive ratchet 53 in a counterclockwise direction. This action will continue for a length of time which is dependent on the number of teeth on ratchet 53. A leaf spring 71 which is mounted in bracket 72 secured to plate 23 biases pawl 68 into engagement with ratchet 53. As ratchet 53 is moving in a counterclockwise direction, pawl 50 will over-ride each of the ratchet teeth because the resilient biasing spring 70 will permit it to pivot in a clockwise direction.

It will readily be appreciated that the duration of the washer cycle is determined by the strength of the spring 39″ in the pump assembly 39 in combination with the size of the orifices of nozzles 45. The duration of wiper operation is preset to exceed the duration of operation of washer pump 39. Since the washer and wiper are actuated substantially simultaneously, the foregoing relative timing provides for a predetermined length of wiper motor operation after the termination of solvent projection to insure the wiping of excess moisture from the windshield.

The operation of wiper motor 13 is terminated after a predetermined number of strokes of wipers 22 in the following manner: After pawl 68 returns ratchet 53 to the position shown in FIG. 2, protuberance 60 of cam follower 61 will fall into notch 60 to permit a spring (not shown) within micro switch 65 to bias stem 64 to an "off" position whereby the circuit to electric motor 13 is broken. Thereafter, automatic parking structure within the wiper motor circuit will park wipers 22 as is well-known in the art.

Whenever wiper motor 13 is placed in operation alone without accompanying operation of the washer, pawl 68 will be caused to oscillate back and forth on the top surface of ratchet tooth 73. The tip of pawl 68 will not engage the depending portion 74 of tooth 73 to energize the stroke-counting mechanism described above because tooth 73 has an upper surface which is longer than the travel of pawl 68. In other words, the tip of pawl 68 will merely slide back and forth on the top surface of tooth 73 without engaging tooth portion 74. The operation of the stroke counting apparatus can only be initiated by the above-described initiating action of motor 46 which moves ratchet sufficiently counterclockwise so that pawl 68 may turn it by successively engaging each of the short teeth thereon.

Whenever the windshield cleaning system is placed in operation in the above-described manner, it is desirable that the wiper blade 22 oscillate back and forth at a high speed if motor 13 is of the multi-speed type. To this end, circuitry (not shown) is associated with microswitch 65 and motor 13 to cause high speed wiper motor operation whenever the washer and wiper are jointly operated, regardless of the fact that the wiper motor may have been previously in operation at a lower speed. Whenever the timing cycle is terminated so that microswitch 65 returns to the position shown in the drawings, the motor 13 will resume low speed operation, if it was producing this type of operation when the cleaning system was actuated.

It will readily be appreciated that instead of using the pneumatically actuated washer pump 39 (as described in Patent No. 2,743,473), an electrically actuated washer system, such as the type shown in Patent No. 2,816,316, may be utilized.

In FIG. 4, a schematic representation of an alternate embodiment of the present invention is shown. This embodiment shows the use of a universal timer plate assembly in a system which is powered entirely by fluid pressure. Suitable mounting arrangements (not shown) are made on plate 23' for receiving fluid pressure motor 75 which may be of any conventional type. It will be appreciated that this mounting arrangement may be analogous to that described above relative to electric motor 13, and a detailed explanation is therefore deemed unnecessary. The drive shaft of motor 75 has a universal member, such as 30 in FIG. 3, affixed thereto for mating engagement with a channel such as 31 FIG. 3). The only difference between adapter plate 23' of FIG. 4 and adapter plate 23 of FIG. 2 is the use of a fluid pressure switch 76 instead of microswitch 65 of FIGS. 2 and 3.

Whenever it is desired to initiate sole operation of wiper motor 75, it is only necessary to manipulate knob 77 of valve 78. Knob 77 actuates a rack and pinion arrangement (not shown) within the valve which causes Bowden wire unit 79 to move motor slide valve 80 to an "on" position. Thereafter, motor 75 will operate in the well-known manner.

Whenever joint washer and wiper operation is desired, button 81 of valve 78 is depressed to cause communication between conduit 82 (leading from engine intake manifold 83), conduit 82', and conduit 84, which is in communication with washer pump 85. As noted above, washer pump 85 may be of the type fully disclosed in Patent No. 2,743,473. Once vacuum is placed in communication with pump 85, the pump will automatically take in a charge of solvent from reservoir 86 and then discharge this solvent through conduits 87 and 88, and nozzles 89 onto a windshield.

Substantially simultaneously with the actuation of pump 85, in the above-described manner, vacuum is caused to communicate with motor 46 (which is the same as motor 46 in FIG. 2). This communication is effected through conduit 90 which has a T connection with conduit 84 leading to washer pump 85. The actuation of motor 46 is momentary to initiate movement of ratchet 73, as described in detail above. After ratchet 73 is initially moved, end 63 of cam follower 61 will move slide valve 91 of valve 76 to the left. This movement of the slide valve will cause communication between conduit 92 (in communication with the intake manifold 83 through conduit 82) and conduit 93 in communication with coupler 94 mounted on motor 75. Coupler 94 may be of the type disclosed in Patent No. 2,877,486. When the foregoing placing of coupler 94 under vacuum is effected, a mechanical connection 95 between coupler 94 and slide valve 80 will move the latter to an "on" position whereby the motor 75 may be subjected to vacuum through conduit 82, and therefore caused to operate.

As discussed above, relative to FIG. 2, ratchet 73 will be caused to operate for a predetermined number of wiper cycles and thereafter cam follower 61 will move to the right. In the embodiment of FIG. 4, the movement of cam follower 61 to the right is accompanied by a corresponding movement of slide valve 91 to the right because of the bias of spring 96. When slide valve 91 returns to its position shown in FIG. 4, the communication of vacuum with coupler 94 will be terminated, whereupon this coupler will cause motor slide valve 80 to be returned to an "off" position to terminate communication of wiper motor 75 with the source of vacuum.

It can thus be seen that either universal timer plate 23 (FIG. 2) or universal timer plate 23' (FIG. 4) may be associated with any type of wiper motor to give a predetermined number of cycles of wiper operation for every windshield cleaning operation wherein there is joint operation of he wiper motor and the washer pump. It will further be appreciated that in lieu of motor 46 (FIGS. 2 and 4), which is utilized to initiate wiper motor operation and the accompanying time cycle, a Bowden wire unit, which is actuated from the control knob on the dashboard, may be utilized directly.

While preferred embodiments of the above invention have been disclosed, it is to be readily understood that the present invention is not to be limited thereto but may be otherwise embodied within the scope of the following claims.

What is claimed is:

1. A windshield cleaning system for a motor vehicle having a fire wall, a cleaner unit including a motor, a supporting structure for mounting the motor on the fire wall, a shaft driven by the motor, a wiper means including a wiper drive shaft and a coupling element for detachably coupling the motor driven shaft and the wiper drive shaft, a supporting journal plate for the wiper drive shaft spaced from and detachably connected to the motor mounting structure, a timing mechanism for automatically controlling the motor to determine the number of wiper strokes of said wiper, said timing mechanism being mounted on the detachable supporting plate, a pumping mechanism for delivering fluid to the windshield, control means for actuating said pumping mechanism, means operated by the pump control means for starting the timing mechanism, switch means mounted on the supporting plate and actuated by the starting of the timing mechanism to operate the motor, and means mounted on the wiper shaft for continuing the operating of the timing mechanism.

2. A windshield cleaning system for a motor vehicle having a fire wall, a cleaner unit including a motor, a supporting structure for mounting the motor on the fire wall, a shaft driven by the motor, a wiper means including a wiper drive shaft and a coupling element for detachably coupling the motor driven shaft and the wiper drive shaft, a supporting journal plate for the wiper drive shaft spaced from and detachably connected to the motor mounting structure, a timing mechanism for automatically controlling the motor to determine the number of wiper strokes of said wiper, said timing mechanism being mounted on the detachable supporting plate, a pumping mechanism for delivering fluid to the windshield, control means for actuating said pumping mechanism, means operated by the pump control means for starting the timing mechanism, switch means actuated by the starting of the timing mechanism to operate the motor, and means responsive to operation of the wiper for continuing the operating of the timing mechanism.

3. In a windshield cleaning system for a motor vehicle having a cleaner unit including a motor, a supporting structure for mounting said motor on a vehicle, a shaft driven by the motor, a wiper means including a wiper drive shaft, a coupling element for detachably coupling the motor driven shaft and the wiper drive shaft, a pump mechanism for delivering fluid to the windshield and control means for actuating said pump mechanism; the combination comprising a mounting plate spaced from and detachably connected to said motor mounting structure, a supporting journal in said mounting plate for receiving said wiper drive shaft, a timing mechanism for automatically controlling the motor to determine the number of wiping strokes of said wiper, said timing mechanism being mounted on the detachable mounting plate, means operated by said pump control means for starting the timing mechanism, switch means mounted on the mounting plate and actuated by the starting of the timing mechanism to operate the motor and means responsive to the operation of the wiper shaft for continuing the operating of the timing mechanism.

4. A windshield cleaning system comprising a wiper unit having a motor with a control and a drive shaft operable for driving a wiper; a washer unit operable to deliver solvent to wet the path of the wiper and a control for the washer unit; and a coordinator unit constituting an entity distinct from said motor and having a demountable support with a driven shaft detachably interlocked with the drive shaft, a wiper-stroke counting mechanism including an eccentric having a disk rotated by said driven shaft and a disk-encircling strap carrying a pawl and having a normally inactive toothed member related to the pawl but adapted to be actively engaged thereby during stroke counting, a wiper unit control for effecting wiper operation, and manually actuated means to initially place the toothed member in position for active engagement by the pawl and to actuate the wiper unit control to start the wiper unit, and means for arresting the wiper unit.

5. A windshield cleaning system comprising a wiper unit having a motor with a control and a drive shaft operable for driving a wiper; a washer unit operable to deliver solvent to wet the path of the wiper and a control for the washer unit; and a coordinator unit constituting a distinct entity from said motor and having a demountable support with a driven shaft detachably interlocked with the drive shaft, wiper-stroke counting mechanism including an eccentric having a disk rotated by said driven shaft and a disk-encircling strap carrying a pawl and having a toothed member normally inactive with respect to the pawl but adapted to be actively engaged thereby during stroke counting, and manually actuable means including an energizing member and an auxiliary motor for placing said toothed member in condition for pawl advancing action, said manually actuable means being effective for starting the wiper unit and initially placing the toothed member in condition for engagement by the pawl, said toothed member thereafter effecting continuous actuation of said wiper unit control after starting of said wiper unit until stroke counting is terminated, and means for arresting the wiper unit.

References Cited in the file of this patent
UNITED STATES PATENTS

| | | |
|---|---|---|
| 2,878,505 | Ziegler | Mar. 24, 1959 |
| 2,925,618 | Ziegler | Feb. 23, 1960 |
| 2,936,476 | Ziegler | May 17, 1960 |
| 2,953,802 | Ziegler | Sept. 27, 1960 |